United States Patent [19]
Savkar

[11] Patent Number: 5,860,152
[45] Date of Patent: Jan. 12, 1999

[54] METHOD AND APPARATUS FOR RAPID COMPUTATION OF TARGET ADDRESSES FOR RELATIVE CONTROL TRANSFER INSTRUCTIONS

[75] Inventor: Sunil W. Savkar, Palo Alto, Calif.

[73] Assignee: Fujitsu Limited, Japan

[21] Appl. No.: 956,251

[22] Filed: Oct. 22, 1997

Related U.S. Application Data

[63] Continuation of Ser. No. 398,151, Mar. 3, 1995, abandoned.

[51] Int. Cl.$^6$ .................................................. G06F 9/32
[52] U.S. Cl. .......................................... 711/213; 395/586
[58] Field of Search .............................. 395/421.03, 586; 365/784, 785, 786, 749; 711/202, 213

[56] References Cited

U.S. PATENT DOCUMENTS

| | | | |
|---|---|---|---|
| 4,203,157 | 5/1980 | Daniels et al. | 364/788 |
| 5,276,825 | 1/1994 | Blomgren et al. | 395/375 |
| 5,418,736 | 5/1995 | Widigen et al. | 364/786 |
| 5,485,587 | 1/1996 | Matsuo et al. | 395/375 |
| 5,522,053 | 5/1996 | Yoshida et al. | 395/421.03 |
| 5,548,546 | 8/1996 | Jang et al. | 364/786 |

FOREIGN PATENT DOCUMENTS

| | | | |
|---|---|---|---|
| 0 265 948 A2 | 5/1988 | European Pat. Off. | G06F 9/38 |
| 0 265 948 A3 | 5/1988 | European Pat. Off. | G06F 9/32 |
| 0 286 260 A3 | 10/1988 | European Pat. Off. | G06F 9/34 |

OTHER PUBLICATIONS

Bernard K. Gunther, "A High Speed Mechanism for Short Branches", Computer Architecture News, Dec. 1990, vol. 18, No. 4, pp. 59–61.

*Primary Examiner*—Thomas C. Lee
*Assistant Examiner*—Gautam R. Patel
*Attorney, Agent, or Firm*—Fenwick & West LLP

[57] ABSTRACT

A method and apparatus accepts a relative control transfer instruction and generates a compact absolute control transfer instruction which may have a number of bits one greater than the relative control transfer instruction and including flags to rapidly construct the target address of the relative control transfer instruction. The compact absolute control transfer instruction is generated by sign extending the displacement of the relative control transfer instructions and adding it to a set of least significant bits from the control transfer instruction address, and optionally coupling some or all of the bits from the result with the original opcode or a different opcode. The target address of the relative control transfer instruction is determined by using, incrementing or decrementing, depending on the state of the flags, a group of the most significant bits from the relative control transfer instruction address and appending the result with the least significant bits from the result of the addition described above.

8 Claims, 5 Drawing Sheets

METHOD AND APPARATUS FOR RAPID COMPUTATION OF TARGET ADDRESSES FOR RELATIVE CONTROL TRANSFER INSTRUCTIONS

RELATED APPLICATIONS

This is a continuation application Ser. No. 08/398,151 filed on Mar. 3, 1995 now abandoned.

RELATED APPLICATIONS

The subject matter of this application is related to the subject matter of the following applications:

application Ser. No. 08/388,602, now U.S. Pat. No. 5,689,673, entitled "INSTRUCTION FLOW CONTROL CIRCUIT FOR SUPERSCALER MICROPROCESSOR" filed on Feb. 14, 1995 by Takeshi Kitahara;

application Ser. No. 08/388,389, now abandoned, entitled "ADDRESSING METHOD FOR EXECUTING LOAD INSTRUCTIONS OUT OF ORDER WITH RESPECT TO STORE INSTRUCTIONS" filed on Feb. 14, 1995 by Michael A. Simone and Michael C. Shebanow;

application Ser. No. 08/388,606, now abandoned, entitled "METHOD AND APPARATUS FOR EFFICIENTLY WRITING RESULTS TO RENAMED REGISTERS" filed on Feb. 14, 1995 by DeForest W. Tovey, Michael C. Shebanow and John Gmuender;

application Ser. No. 08/388,364, now abandoned, entitled "METHOD AND APPARATUS FOR COORDINATING THE USE OF PHYSICAL REGISTERS IN A MICROPROCESSOR" filed on Feb. 14, 1995 by DeForest W. Tovey, Michael C. Shebanow and John Gmuender;

application Ser. No. 08/390,885, now abandoned, entitled "PROCESSOR STRUCTURE AND METHOD FOR TRACKING INSTRUCTION STATUS TO MAINTAIN PRECISE STATE" filed on Feb. 14, 1995 by Gene W. Shen, John Szeto, Niteen A. Patkar and Michael C. Shebanow;

application Ser. No. 08/397,893, now abandoned, entitled "RECLAMATION OF PROCESSOR RESOURCES IN A DATA PROCESSOR" filed on Mar. 3, 1995 by Michael C. Shebanow, Gene W. Shen, Ravi Swami, Niteen Patkar;

application Ser. No. 08/397,891, now abandoned, entitled "METHOD AND APPARATUS FOR SELECTING INSTRUCTIONS FROM ONES READY TO EXECUTE" filed on Mar. 3, 1995 by Michael C. Shebanow, John Gmuender, Michael A. Simone, John R.F.S. Szeto, Takumi Maruyama and DeForest W. Tovey;

application Ser. No. 08/397,911, now U.S. Pat. No. 5,632,028, entitled "HARDWARE SUPPORT FOR FAST SOFTWARE EMULATION OF UNIMPLEMENTED INSTRUCTIONS" filed on Mar. 3, 1995 by Shalesh Thusoo, Farnad Sajjadian, Jaspal Kohli, and Niteen Patkar;

application Ser. No. 08/398,284, now abandoned, entitled "METHOD AND APPARATUS FOR ACCELERATING CONTROL TRANSFER RETURNS" filed on Mar. 3, 1995 by Akiro Katsuno, Sunil Savkar and Michael C. Shebanow;

application Ser. No. 08/398,066, now abandoned, entitled "METHODS FOR UPDATING FETCH PROGRAM COUNTER" filed on Mar. 3, 1995 by Akira Katsuno, Niteen A. Patkar, Sunil Savkar and Michael C. Shebanow;

application Ser. No. 08/397,910, entitled "METHOD AND APPARATUS FOR PRIORITIZING AND HANDLING ERRORS IN A COMPUTER SYSTEM" filed on Mar. 3, 1995 by Chih-Wei David Chang, Joel Fredrick Boney and Jaspal Kohli;

application Ser. No. 08/397,800, now U.S. Pat. No. 5,638,312, entitled "METHOD AND APPARATUS FOR GENERATING A ZERO BIT STATUS FLAG IN A MICROPROCESSOR" filed on Mar. 3, 1995 by Michael Simone; and application Ser. No. 08/397,912, now U.S. Pat. No. 5,687,353 entitled "ECC PROTECTED MEMORY ORGANIZATION WITH PIPELINED READ-MODIFY-WRITE ACCESS" filed on Mar. 3, 1995 by Chien Chen and Yizhi Lu;

each of the above applications having the same assignee as the present invention, and each incorporated herein by reference in their entirety.

FIELD OF INVENTION

This invention relates to processor design and more specifically, to the design of a processor implementation which executes relative control transfer instructions.

BACKGROUND OF INVENTION

Conventional processors execute instructions from a program containing a sequence of instructions. Many conventional processors utilize control transfer instructions, such as branches, to allow the processor to vary the processing order of the instructions from the serial program sequence. Some control transfer instructions may be unconditional, causing a branch in all circumstances. Other control transfer instructions may be conditional, transferring the program flow upon a met condition, such as a result of an operation being equal to zero. The present invention operates with both unconditional as well as conditional control transfer instructions.

Control transfer instructions indicate a memory address from which the next logical instruction is to be read and executed. This address is known as the target address or the target. In the case of a conditional control transfer instruction, this next logical instruction at the target address is only processed if a condition indicated by the instruction is met, otherwise the next physical instruction is used as the next logical instruction.

The control transfer instruction may indicate the target address in a variety of ways. In some conventional processors, the instruction contains the complete target address. Such control transfer instructions are referred to as "absolute." Such control transfer instructions execute rapidly because the entire address is available within the instruction, although the instruction length can be large.

Other control transfer instructions indicate the target address using an instruction displacement field relating to the memory address of the control transfer instruction itself. The memory address of the control transfer instruction may be the address of the first word of the instruction, although any memory address related in some fashion to the instruction may be used. The displacement, which may be positive or negative, is added to the memory address of the control transfer instruction to produce the target address. Such control transfer instructions are referred to as "relative." Because many target addresses are near the address of the control transfer instruction, the use of relative control transfer instructions can result in substantial instruction length savings. However, the use of relative control transfer instructions can slow the execution of the instructions because the processor must first add the displacement to the address of the control transfer instruction to produce the target address.

One conventional technique used to speed the execution of relative control transfer instructions has been to utilize faster adders to compute the target address when the control transfer instruction is executed. However, the use of faster adders may not be able to achieve a desired speed of execution.

Another conventional technique has been to precompute the target address in advance of the execution of the control transfer instruction. While this technique optimizes the speed of execution, it can dramatically increase the size of storage required to store the control transfer instruction and can increase the size of the data paths required to deliver relative control transfer instructions to the unit which will execute the instruction.

Another conventional technique has been to predict the target address by storing the most recent set of target addresses from other executed control transfer instructions, under the theory that target addresses from several control transfer instructions are often the same. Such a technique requires additional storage to store previous target addresses, and can incur additional processor time if the predicted target is incorrect.

SUMMARY OF INVENTION

According to the present invention, the low order bits of the target address are precomputed by adding the relative displacement to a portion of the address of the control transfer instruction, to produce a set of low order bits of the target address, and two flag bits. The remaining high order bits of the target address will either be equal to the same number of high order bits of the address of the control transfer instruction, or one more or one less. The flag bits indicate whether equality, increment or decrement is applied to the high order bits of the control transfer instruction address to determine the high order bits of the target address, and such high order bits of the target address are then appended to the precomputed low order bits to produce the target. This requires only a fast increment or decrement operation to be used at execution time to compute the target address instead of a full addition or subtraction, while requiring the storage of only one extra bit per control transfer instruction.

BRIEF DESCRIPTION OF THE DRAWINGS

FIG. 4 is a block schematic diagram of an apparatus which computes the low order bits of a target address and two flag bits according to the present invention

DETAILED DESCRIPTION OF A PREFERRED EMBODIMENT

One embodiment of the present invention can convert a relative control transfer instruction into a compact absolute control transfer instruction which contains a set of least significant bits of the target address and two flag bits in a space only one bit larger than that required by the displacement of the relative control transfer instruction. The use of the flag bits, the set of least significant bits, and a set of the most significant bits of the relative control transfer instruction address allows for rapid determination of the target address with a minimum of computation time.

Figure 1:
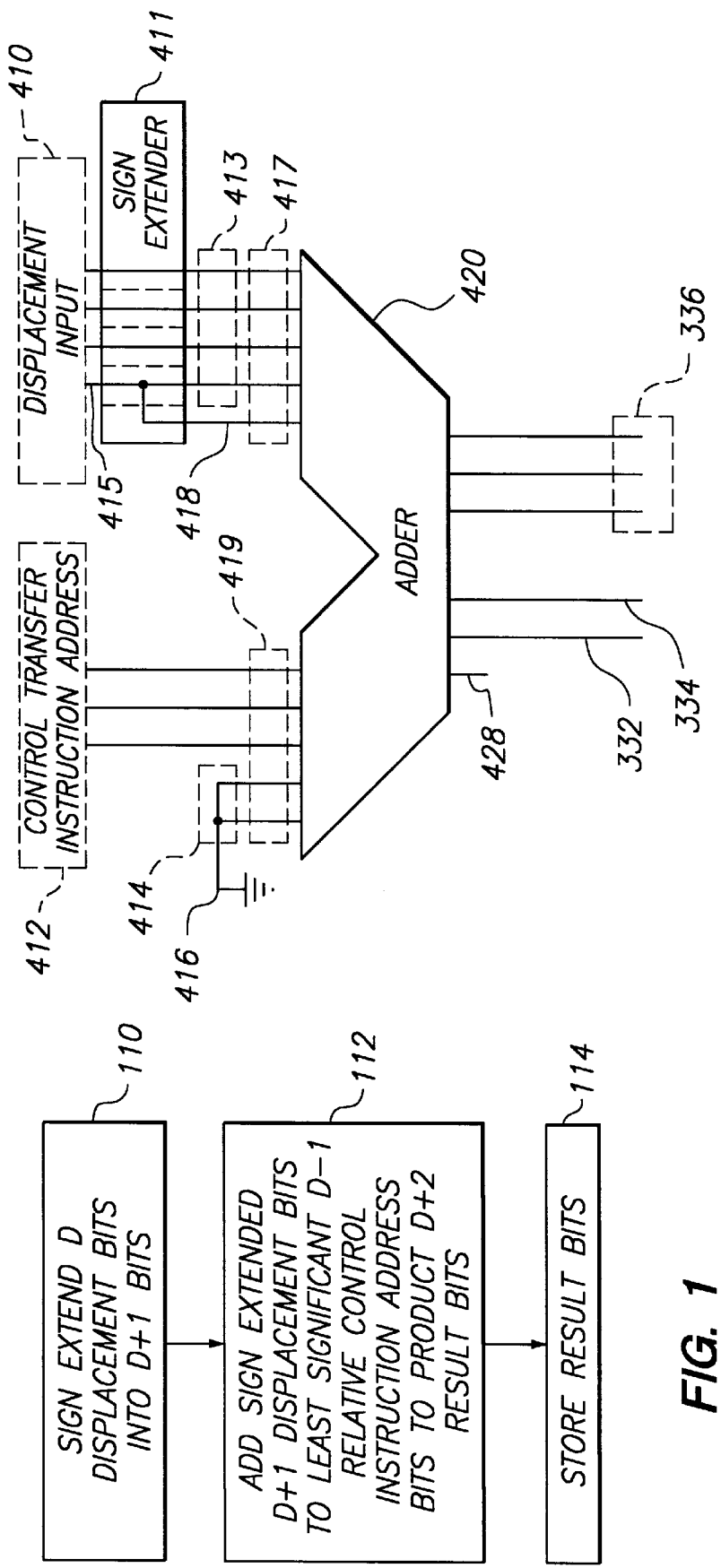
FIG. 1 is a flowchart illustrating a method according to the present invention of computing a compact absolute control transfer instruction.

Referring now to FIG. 1, a method for determining a W bit address from a relative control transfer instruction having displacement of D bits is shown. The D relative displacement bits are sign extended 110 into D+1 bits, and added 112 to the absolute value of the D−1 least significant bits of the relative control transfer instruction address to produce a D+2 bit result, bits D+1 down to bit 0. The D−1 least significant bits of the relative control transfer instruction are always treated as a positive number. Some of the D+2 result bits may be stored 114 in place of the original displacement bits, or in another location, and some of the remaining bits may also be stored. As described below, bit D+1, the most significant bit, need not be stored. Thus, storage of the D+1 remaining bits requires only one additional bit storage position beyond the original D bit displacement.

Producing a target address is quite efficient using the result bits of FIG. 1 and the address of the relative control transfer instruction. In one embodiment, the address of the relative control transfer instruction is the address of the first word of the control transfer instruction, although any address related to the control transfer instruction will allow operation of the present invention. The second most significant bit of the result bits, bit D, is referred to as the operation flag, which will indicate the type of operation described below which may be required to adjust the set of most significant control transfer instruction address bits. The third most significant bit in the result, bit D−1 is referred to as the enable operation flag, which will indicate as described below whether any operation on the set of most significant control transfer address bits is required. The D−1 least significant bits in the result are used as the least significant bits in the target address as described below.

Figure 2:
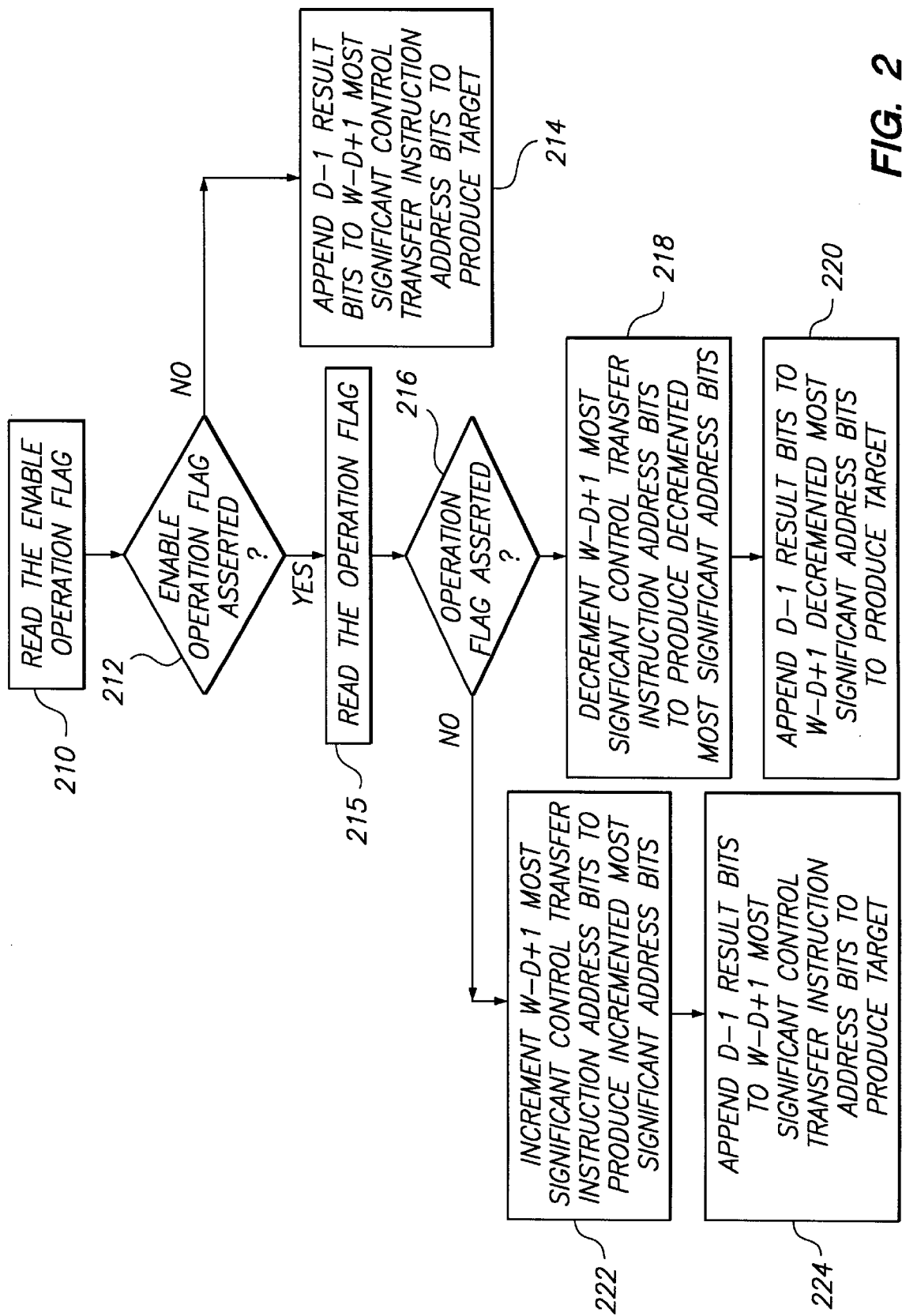
FIG. 2 is a flowchart illustrating a method according to the present invention of generating a target address from a compact absolute control transfer instruction.

Referring now to FIG. 2, the remaining W−D+1 most significant bits in the target address are determined by first reading 210 and testing 212 the enable operation flag bit. Where the enable operation flag bit has a value equal to zero, the D−1 least significant result bits are appended 214 to the W−D+1 most significant bits in the address of the relative transfer control instruction, each bit in the same order of significance as it appeared in the relative control transfer address or result.

Where the enable operation flag has a value equal to one, or asserted, the operation flag is read 215 and tested 216 to determine the W−D+1 most significant bits in the address of the target. The operation flag need not be read 215 after the enable operation flag is tested 212, but may be read 215 earlier in the method of the present invention. Where the enable operation flag has a value equal to one and the operation flag has a value equal to zero, the W−D+1 most significant bits in the relative transfer control instruction address are first incremented 222 by one to produce the W−D+1 most significant bits in the target address prior to appending 224 them to the D−1 least significant result bits as in step 214. Where the enable operation flag is equal to one and the operation flag is equal to one, the W−D+1 most significant bits in the relative transfer control instruction address are first decremented 218 by one prior to appending 220 them as in step 214 to produce the W−D+1 most significant bits in the target address. In one embodiment, the most significant control transfer instruction address bits are not actually incremented or decremented, but a copy of them is incremented 222 or decremented 218.

Figure 3:
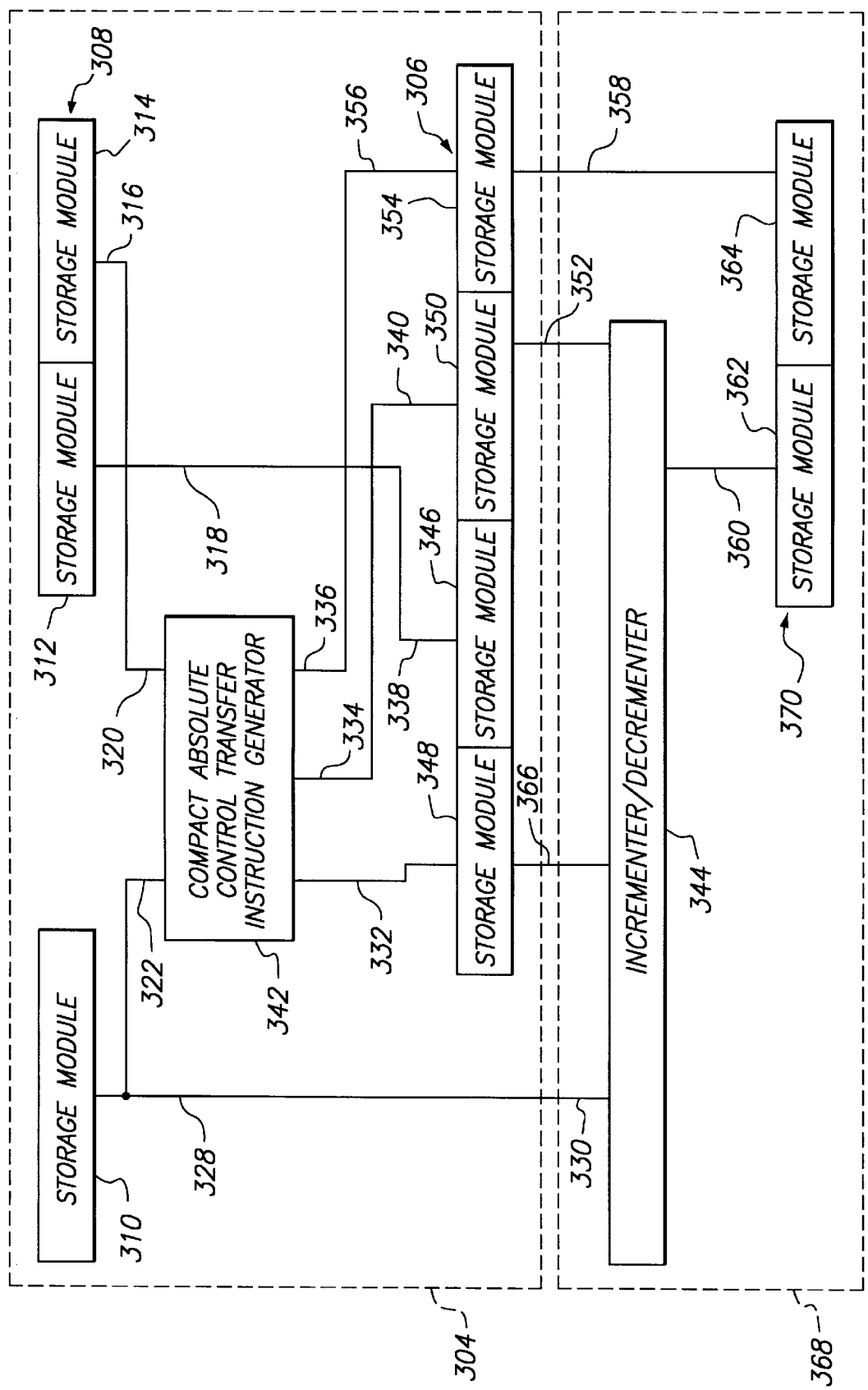
FIG. 3 is a block schematic diagram of a processor instruction transfer apparatus according to the present invention.

Referring now to FIG. 3, one embodiment of an apparatus 304 of the present invention is shown which contains storage for the relative control transfer instruction and its address and produces a compact absolute control transfer instruction. Compact absolute control transfer instruction generator 342 accepts as input 322 relative control transfer instruction address stored in storage module 310, and as input 320 the displacement stored in storage module 314 from the instruction stored in storage module 308 which also contains the relative transfer instruction opcode stored in storage module 312. In one embodiment, the address, opcode and displacement are not stored in storage modules 310, 312, 314, but are merely provided at inputs 322, 318 and 320.

The compact absolute control transfer instruction generator 342 is shown in detail in FIG. 4. Referring now to FIG. 4, displacement input 410 is sign extended at least one bit by sign extender 411. FIG. 4 shows a four-bit displacement, although any size greater than one may be used. In the sign extender 411, all inputs 410 are connected to their corresponding outputs 413, and the most significant output 418 is coupled to the most significant input 415. A buffer may be coupled to the most significant input 415 if the fanout due to the addition of the most significant output 418 would be too great.

The outputs 413, 418 of the sign extender 411 are coupled to one of the sets of inputs 417 of a D+1 bit adder 420, and the other set of adder inputs 419 are coupled to receive the D−1 least significant bits of the control transfer instruction address 412. If the number of inputs in the first set 417 must be equal to the number of inputs in the second set 419, then the most significant two bits 414 in the second set may be coupled to ground 416 in order to always treat input 419 as a positive number.

Referring now to FIGS. 3 and 4, the second most significant adder output 332, bit D, may be stored in storage module 348 as the operation flag, third most significant bit 334, bit D−1 may be stored in storage module 350 as the operation enable flag, and the remaining D−1 least significant bits 336 of the output of the adder 420 may be stored as the least significant target address bits in storage module 354. The control transfer instruction opcode bits from storage module 312 may be stored into storage module 346 to generate a compact relative absolute instruction stored in storage module 306 having a a number of bits only one greater than the number of bits in the relative control transfer instruction stored in storage module 308 when the most significant bit 428 of the output of adder 420 is unconnected to the storage module 306. In another embodiment, a different opcode is stored at module 346. In another embodiment, no opcode is stored, and module 346 is not used, as the outputs 332, 334, 336, 318 are coupled directly to the next stage described below. Module 346 is not required for the present invention to operate.

Referring now to FIG. 3, an apparatus 368 for determining the a target address from a compact absolute control transfer instruction is shown. Incrementer/decrementer 344 is coupled to receive the most significant W−D+1 bits of the address of the relative control transfer instruction at input 330, and the operation flag bit and enable operation flag bit at inputs 366 and 352 respectively. Incrementer/decrementer 344 passes the W−D+1 address bits from input 330 unchanged to output 360 if enable operation flag bit at the input 352 is zero. Incrementer/decrementer 344 increments the W−D+1 address bits from input 330 and passes the incremented result to output 360 if enable operation flag bit at the input 352 is equal to one and operation flag bit at the input 366 is equal to zero. Incrementer/decrementer 344 decrements the W−D+1 address bits from input 330 and passes the decremented result to output 360 if enable operation flag bit at the input 352 is equal to one and operation flag bit at the input 366 is equal to one. The output 360 from incrementer/decrementer 344 may be stored as the high order bits in storage module 362 and low order bits stored in storage module 354 and available on line 358 may be stored in storage module 364 to complete the generation of the target address in storage module 370. In one embodiment the target address is not separately stored, but available at outputs 360, 358.

The operation of the apparati 304 or 368 may be enabled only for instructions stored in module 308 which are relative control transfer instructions by using a decoder to decode the opcode bits stored in storage module 312 or 346 as described below.

Figure 5:
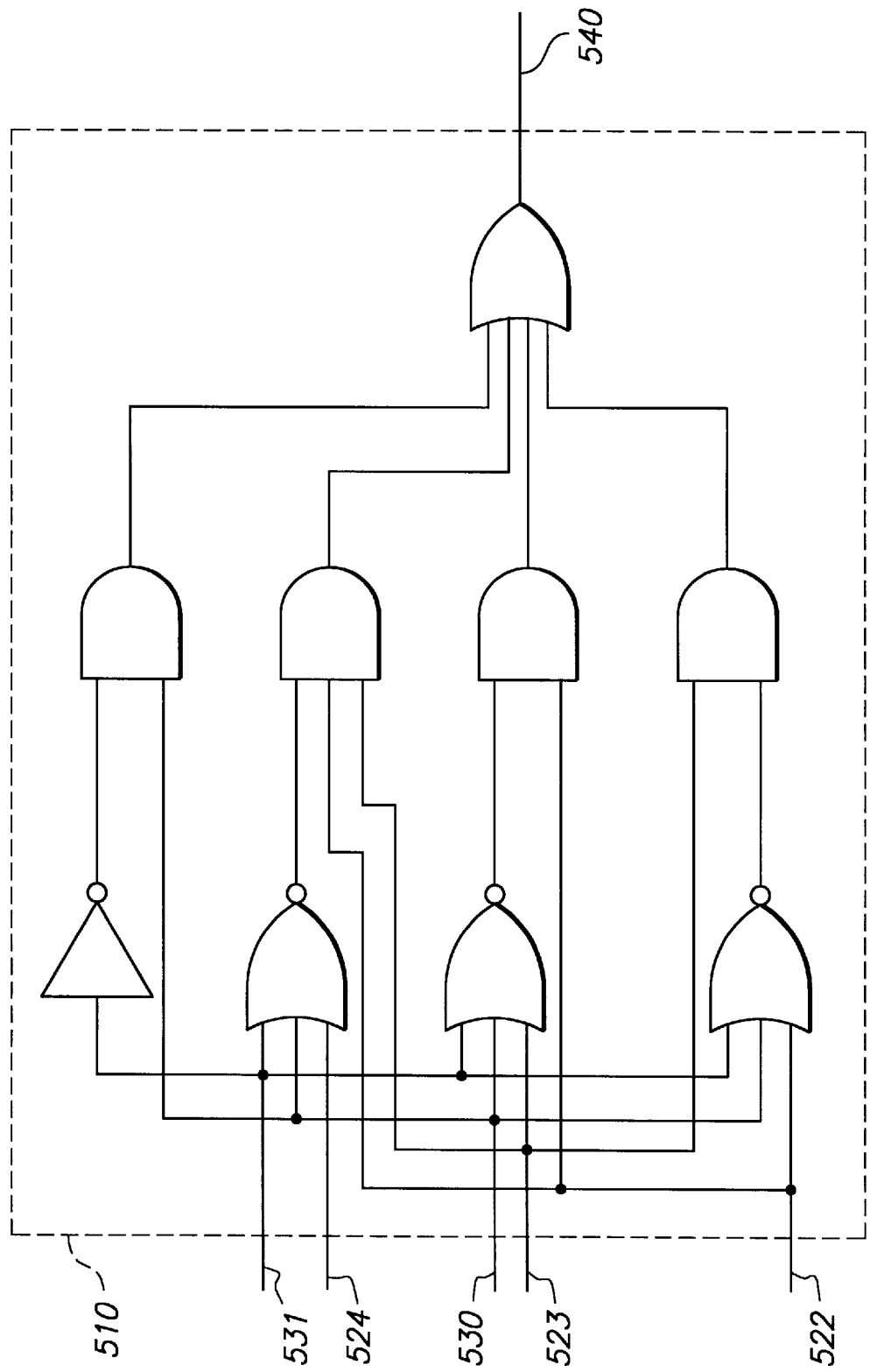
FIG. 5 is a schematic diagram of a decoder used to determine if an instruction is a relative control transfer instruction according to the present invention.

The present invention will operate with any processor instruction set which contains relative control transfer instructions. In one embodiment, the present invention operates with the SPARC instruction set. Referring now to FIG. 5, a decoder 510 is shown which decodes SPARC relative control transfer instruction opcodes as described in SPARC International, *SPARC Architecture Manual*, pp74–77 and 136–139 (9th ed. Prentice Hall, 1994), D. L. Weaver and T. Germond, editors. Inputs 531, 530, 524, 523 and 522 correspond to instruction bits 31, 30, 24, 23 and 22 respectively in the opcode of the instruction. Output 540 is asserted high if a relative control transfer instruction, bpr, bpcc, bcc or call, is contained in the opcode presented at the inputs 531, 530, 524, 523 and 522. The gates in decoder 510 implement the equation:

$$\text{output } 540 = bpr + bpcc + bcc + \text{call} \tag{eq. 1}$$

where:

$$bpr = !(i[31]+i[30]+i[24]) \times i[23] \times i[22] \tag{eq. 2}$$

$$bpcc = !(i[31]+i[30]+i[23]) \times i[22] \tag{eq. 3}$$

$$bcc = !(i[31]+i[30]+i[22]) \times i[23] \tag{eq. 4}$$

$$\text{call} = !i[31] \times i[30] \tag{eq. 5}$$

$$i[n] = \text{instruction bit } n, \ 0 \le n \le 31 \tag{eq. 6}$$

and '+' means "logical or", 'x' means "logical and" and '!' means "inverse of."

Figure 6:
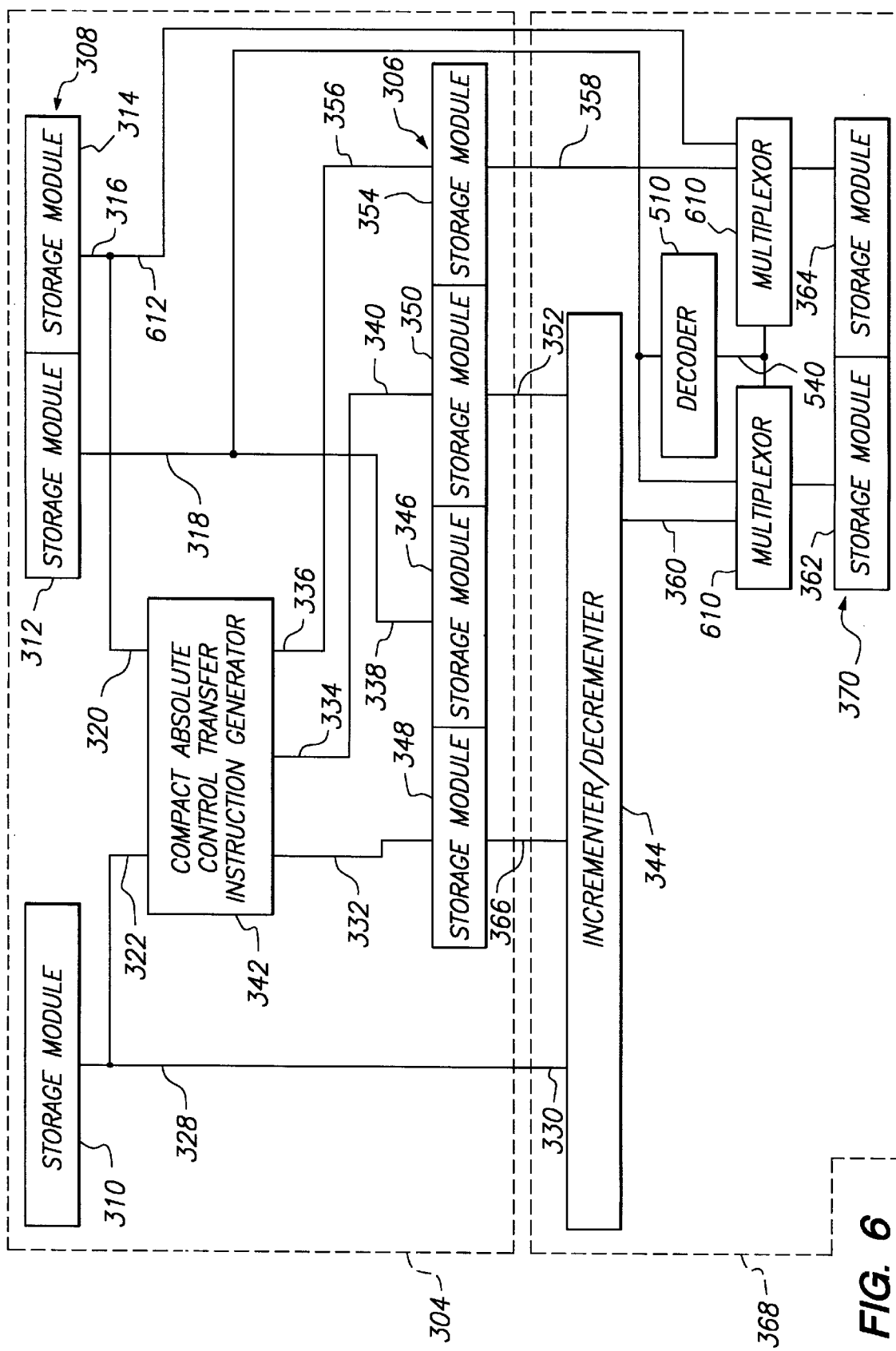
FIG. 6 is a block schematic diagram of the apparatus of FIG. 3, with additional circuitry capable of passing non-relative control transfer instructions unchanged.

Referring now to FIG. 6, the apparatus of FIG. 3 is shown with the decoder 510 of FIG. 5 and multiplexors 610 to select which bits are placed into storage module 370. If a relative control transfer instruction opcode is detected on bus 318, decoder 510 asserts output 540 instructing multiplexors 610 to pass inputs from buses 360, 358 to storage module 370 as described above in FIG. 3. If the opcode on bus 318 does not correspond to a relative control transfer instruction, decoder 510 does not assert output 540 instructing multiplexors 610 to pass the full instruction on buses 318, 612 unchanged to storage module 370.

What is claimed is:

1. A method of rapidly calculating a destination address from a source address having S bits and a displacement having D bits, the method comprising:

(1) sign extending the displacement by one bit to produce a sign extended displacement having D+1 bits;

(2) adding a first set of bits comprising D−1 lowest order bits of the source address to the sign extended displacement to form a sum having D+2 bits;

(3a) incrementing a second set of bits comprising S−D+1 highest order bits of the source address to form a prefix having S−D+1 bits if a second highest order bit of the sum is low and a third highest order bit of the sum is high;

(3b) decrementing the second set of bits to form the prefix if the second highest order bit of the sum is high and the third highest order bit of the sum is high;

(3c) setting the prefix equal to the second set of bits if the third highest order bit of the sum is low; and (4) appending to the prefix a third set of bits comprising the D−1 lowest order bits of the sum to form the destination address.

2. The method in claim 1, wherein the sum comprises a compact absolute control transfer instruction.

3. The method of claim 1, wherein the highest order bit of the sum remains uncalculated.

4. The method of claim 1, where the method is performed within a microprocessor or microcontroller.

5. An apparatus for rapidly calculating a destination address from a source address having S bits and a displacement having D bits, the apparatus comprising:

(1) means for sign extending the displacement by one bit to produce a sign extended displacement having D+1 bits;

(2) means for adding a first set of bits comprising D−1 lowest order bits of the source address to the sign extended displacement to form a sum having D+2 bits;

(3a) means for incrementing a second set of bits comprising S−D+1 highest order bits of the source address to form a prefix having S−D+1 bits if a second highest order bit of the sum is low and a third highest order bit of the sum is high;

(3b) means for decrementing the second set of bits to form the prefix if the second highest order bit of the sum is high and the third highest order bit of the sum is high;

(3c) means for setting the prefix equal to the second set of bits if the third highest order bit of the sum is low; and (4) means for appending to the prefix a third set of bits comprising the D−1 lowest order bits of the sum to form the destination address.

6. The apparatus in claim 5, wherein the sum comprises a compact absolute control transfer instruction.

7. The apparatus of claim 5, wherein the highest order bit of the sum remains uncalculated.

8. The apparatus of claim 5, where the apparatus comprises a microprocessor or microcontroller.

* * * * *